United States Patent
Yogeshwar et al.

(10) Patent No.: US 6,947,598 B2
(45) Date of Patent: Sep. 20, 2005

(54) METHODS AND APPARATUS FOR GENERATING, INCLUDING AND USING INFORMATION RELATING TO ARCHIVED AUDIO/VIDEO DATA

(75) Inventors: Jay Yogeshwar, Lawrenceville, NJ (US); Stephen A. Martucci, Kendall Park, NJ (US); Bobby R. Gupta, Robbinsville, NJ (US); Melanie R. Fendt, Cherry Hill, NJ (US); Frederick M. Venzie, III, Cherry Hill, NJ (US)

(73) Assignee: Front Porch Digital Inc., Cherry Hill, NJ (US)

( * ) Notice: Subject to any disclaimer, the term of this patent is extended or adjusted under 35 U.S.C. 154(b) by 647 days.

(21) Appl. No.: 09/839,354

(22) Filed: Apr. 20, 2001

(65) Prior Publication Data

US 2003/0210821 A1 Nov. 13, 2003

(51) Int. Cl.$^7$ ................................................. G06K 9/36
(52) U.S. Cl. ........................ 382/232; 382/239; 382/247
(58) Field of Search ................................. 382/232, 239, 382/247, 298; 375/240.13, 240.01, 240.12; 358/426.03; 704/500; 341/51, 50, 60, 76

(56) References Cited

U.S. PATENT DOCUMENTS

| | | | |
|---|---|---|---|
| 5,122,873 A | 6/1992 | Golin | 375/240.23 |
| 5,157,511 A | 10/1992 | Kawai et al. | 386/68 |
| 5,546,191 A | 8/1996 | Hibi et al. | 386/83 |
| 5,684,714 A | 11/1997 | Yogeshwar et al. | 370/521 |
| 5,686,904 A * | 11/1997 | Bruwer | 340/5.23 |
| 5,969,755 A | 10/1999 | Courtney | 348/143 |
| 6,031,939 A | 2/2000 | Gilbert et al. | 382/239 |
| 6,100,940 A * | 8/2000 | Dieterich | 348/700 |
| 6,115,035 A | 9/2000 | Compton et al. | 345/327 |
| 6,118,925 A | 9/2000 | Murata et al. | 386/46 |
| 6,125,348 A * | 9/2000 | Levine | 704/500 |
| 6,185,363 B1 | 2/2001 | Dimitrova et al. | 386/69 |

(Continued)

FOREIGN PATENT DOCUMENTS

| | | | |
|---|---|---|---|
| EP | 0 912 063 A2 | 4/1999 | H04N/7/50 |
| EP | 0 919 952 A1 | 6/1999 | G06T/9/00 |
| EP | 1037473 * | 9/2000 | H04N/7/58 |
| JP | 2001094997 * | 4/2001 | H04N/7/32 |
| WO | WO 98/21688 | 5/1998 | G06K/9/00 |

OTHER PUBLICATIONS

Pereira M et al: "Re–Codable Video" Proceedings of the International Conference on Image Processing (ICIP) Auctin, Nov. 13–16, 1994, Los Alamitos, IEEE Comp. Soc. Press, US, vol. 2 Conf. 1, Nov. 13, 1994 pp. 952–956, XP000522756, ISBN: 0–8186–6952–7, p. 953, first complete paragraph: "2. The 2–stage coding algorithm".

(Continued)

*Primary Examiner*—Anh Hong Do
(74) *Attorney, Agent, or Firm*—Straub & Pokotylo; Michael P. Straub

(57) ABSTRACT

Archival storage and retrieval of audio/video information is described. Audio and/or video information is digitized, compressed and stored in an intermediate archive format (IAF), which preserves the content at a high-enough quality for subsequent retrieval and conversion into various formats required at the time of use or distribution. A single capture operation is performed with ancillary metadata being added to facilitate subsequent searching, indexing and format conversion. Captured data content is catalogued and indexed at or subsequent to the creation of an IAF file that includes the archived information. The IAF includes a family of audio-video digital encoding formats based on public standards. The encoding format used in any particular application is determined at encoding time from information provided by the archive system user. At encoding, the particular encoding scheme is selected to optimize a tradeoff between storage constraints and end use quality requirements.

27 Claims, 8 Drawing Sheets

U.S. PATENT DOCUMENTS

| | | | | |
|---|---|---|---|---|
| 6,188,428 B1 | | 2/2001 | Koz et al. ........................ | 348/7 |
| 6,192,083 B1 | * | 2/2001 | Linzer et al. .......... | 375/240.29 |
| 6,263,313 B1 | | 7/2001 | Milsted et al. .................. | 705/1 |
| 6,278,735 B1 | * | 8/2001 | Mohsenian ................. | 375/240 |
| 6,434,196 B1 | * | 8/2002 | Sethuraman et al. ... | 375/240.12 |
| 6,618,167 B1 | * | 9/2003 | Shah ......................... | 358/1.15 |
| 6,674,796 B1 | * | 1/2004 | Haskell et al. .......... | 375/240.01 |

OTHER PUBLICATIONS

Chang S–F et al: "Multimedia Search and Retrieval," Multimedia Systems, Standards, and Networks, New York: Marcel Dekker, US. 2000, pp. 559–584, I–II, XP001112907, ISBN: 0–8247–9303–X, the whole document.

Manjunath B S et al: "Image Retrieval in Digital Libraries" Multimedia Systems, Standards, and Networks, New York: Marcel Dekker, US, 2000, pp. 585–609, I–II, XP001112908, ISBN: 0–8247–9303–X, the whole document.

MediaSite Inc., "Products", downloaded from: http://www.mediasite.com/corporateweb/products/ on Apr. 20, 2001, 2 pages.

MediaSite Inc., "MediaSite Webfinder", downloaded from: http://www.mediasite.com/corporateweb/products/webfinder.html on Apr. 20, 2001, 2 pages.

MediaSite Inc., "MediaSite Publisher 4.1", downloaded from: http://www.mediasite.com/corporateweb/products/publisher.html on Apr. 20, 2001, 2 pages.

MediaSite Inc., "Advanced Indexing Modules, Beyond the basics", downloaded from: http://www.mediasite.com/corporateweb/products/module_manager.html on Apr. 20, 2001, 1 page.

MediaSite Inc., "Advanced Indexing Modules, Auto Indexer Module", downloaded from: http://www.mediasite.com/corporateweb/products/auto_index.html on Apr. 20, 2001, 1 page.

MediaSite Inc., "Advanced Indexing Modules, Real–Time Speech", downloaded from: http://www.mediasite.com/corporateweb/products/realtime_speech.html on Apr. 20, 2001, 2 pages.

MediaSite Inc., "Advanced Indexing Modules, Highlights Index", downloaded from: http://www.mediasite.com/corporateweb/products/hilights.html on Apr. 20, 2001, 1 page.

MediaSite Inc., "Advanced Indexing Modules, Image Index", downloaded from: http://www.mediasite.com/corporateweb/products/image_index.html on Apr. 20, 2001, 1 page.

MediaSite Inc., "Advanced Indexing Modules, Media Formats Module", downloaded from: http://www.mediasite.com/corporateweb/products/media_formats.html on Apr. 20, 2001, 1 page.

* cited by examiner

METHODS AND APPARATUS FOR GENERATING, INCLUDING AND USING INFORMATION RELATING TO ARCHIVED AUDIO/VIDEO DATA

FIELD OF THE INVENTION

The present invention is directed to the archiving, storage, retrieval and distribution of audio, video and/or other types of data.

BACKGROUND OF THE INVENTION

In the modern world there is an abundance of audio and video material in existence with more created daily. Common examples of audio/video material include e.g., songs, movies, television, radio broadcasts, etc. More mundane examples of audio and/or video information include images of scanned documents, tape recordings of court depositions, audio and/or video recordings of business meetings, recordings of communications signals, e.g., recordings such as wiretaps made by the government, etc.

Pre-existing audio/video material, such as old television shows, movies, radio recordings, songs, etc. represent a wealth of information that is often desirable to maintain and preserve for future generations. Similarly, the audio/video information created on a daily basis for entertainment and other purposes also represents information that, in many cases, it would be desirable to preserve for long periods of time if not indefinitely.

Material to be archived can be in any of several analog or digital formats and on any of several types of media. There is a need to organize and store this material so that the content can be preserved and then searched and retrieved for later use. Later use of archived material can require the material be delivered in its original, or close to original, format or a different format.

Long term storage, e.g., archiving, of video and other information presents many problems not the least of which is the introduction of errors into the information by the failure of the storage medium itself over time. For example, film fades over time making it an unsatisfactory long term storage media for movies and other information.

The advent of computers, the relative stability of modern digital storage media, and the ability to correct errors introduced by digital storage, e.g., through the use of error correction codes and other error correction techniques, makes digital storage of information much more attractive than many older storage techniques. The ability to index, easily access, and accurately reproduce data which is stored digitally makes digital archiving of data, including audio/video information an ever more attractive option. Analog audio and video content needs to be digitized if digital archiving of the material is to be performed. This may be achieved by performing digital sampling operations on the analog audio/video information to be archived.

Significant decreases in the cost of digital storage media have further increased the attractiveness of digital storage as an archiving technique. However, given the vast amounts of information that often need to be archived, in many cases the storage of information and the cost of transmitting such information in an uncompressed state still remains impractical. Accordingly, if information is to be archived in a digital form, in many cases there will be a need to use some form of data compression prior to storing the data in the archive.

Furthermore, audio and video content normally needs to be compressed and formatted if one wishes to use modern digital transmission techniques to deliver archived information to an end user. Utilized transmission techniques may include use of the Internet (using Internet Protocol), telecommunication channels such as switched networks, satellites and/or wireless communications system. In each of these cases, very specific compression and formatting steps are often required for data delivery.

While proprietary data compression algorithms may be favored by some companies offering archiving services, the use of proprietary compression algorithms can present problems in regard to future retrieval of the data. In the case of long term storage of data, the company which created the archive on behalf of a client may be out of business by the time the archived information is to be accessed. This can make it difficult to obtain the required decompression programs in a form which can be run on computers which are in use at the time data retrieval and thus decompression is to be performed.

While volume presents one problem with the archiving of audio/video information, the variety of input and output formats which need to be supported create other problems. In many cases, the archived information will have to be output in multiple formats some of which may not even exist at the time the digital archive is initially created. For many users of an archive system, e.g., video archiver's, the ability to output archived information to different formats with little or minimum loss in image quality can be important. However, for other archive users, e.g., people archiving video corresponding to business meetings or court proceedings, a much higher degree of image degradation, corresponding to higher compression and thus reduced storage and transmission costs, may be acceptable.

The ability to search and access an archive is important particularly as the size of an archive increases. Various known data storage systems index data as it is added to an archive but do not include support for indexing additional aspects of the archived information after the archive is created. Such indexing can significantly facilitate the subsequent retrieval of data. Unfortunately, in the case of long term data storage, the information included in an index created at the time of archiving often proves inadequate for previously unforeseen search and retrieval needs.

From the above discussion, it should be apparent that digitized and compressed data can be well suited for archiving, as it can provide reliable long term storage and allows for electronic cataloguing and indexing in addition to computer-assisted functions such as search and retrieval.

Known systems for digitizing audio and video content and producing digital files therefrom normally put the material into the specific end-user format required for a particular application, e.g., radio or television broadcast. Unfortunately, such application formats tend to be optimized for a particular purpose, e.g., to produce a data stream limited by the capacity of a particular communications channel, and not for the purpose of subsequent conversion from the initially generated format to other formats. Accordingly, from an archiving perspective, storage of data in an end user format designed for a particular application is often unsuitable since conversion from the first end user format to another end user format will, in many cases, result in image and/or audio quality significantly below what could have been obtained from the original information source.

With modern systems, the solution has been to preserve the original source of the audio/video data and to re-submit the source for digitization if a new digital format is required for another application or at a later time.

Thus, in known systems, to generate data in another format at a later time requires that the original source of the audio/video content, e.g., the analog film, be preserved for subsequent use or that the data in the original end user format be converted to another end user format which can negatively impact ultimate image quality.

Since storage of information in non-digital form has the problems discussed and, in addition, since re-digitizing of analog source material is an inefficient use of resources since previously performed work is repeated each time a new application format needs to be supported, it is desirable that any digital archiving technique support multiple output formats.

In view of the above discussion, it is apparent that there is a need for improved digital archiving methods and apparatus.

SUMMARY OF THE INVENTION

The present invention is directed to methods and apparatus for the archival storage and retrieval of audio/video information. In accordance with the present invention audio and/or image, e.g., video, information is digitized, compressed and stored in an intermediate archive format (IAF), which preserves the content at a high-enough quality for subsequent retrieval and conversion into various formats required at the time of use or distribution. For purposes of the present application images include, e.g., still images, pictures, frames, or portions thereof.

In accordance with the invention, a single capture operation is performed with ancillary metadata being generated and added to facilitate subsequent searching, indexing and format conversion.

Captured data content is catalogued and indexed at or subsequent to the creation of an IAF file that includes the archived, e.g., encoded, information. The IAF includes a family of audio-video digital encoding formats based on public standards, e.g., MPEG (MPEG-1, MPEG-2, MPEG-4, etc.), JPEG, DV, etc. For each encoding format multiple encoding profiles and/or levels may be supported with different profiles/levels corresponding to different image and/or audio file quality levels.

The encoding format used in any particular application is determined from information provided by the archive system user, data received with the information to be archived, and/or information generated by analyzing the information to be archived. Preexisting format information and input image quality information are well suited for determination from automated analysis of input data. Content information may also be determined by an automated analysis operation prior to encoding. Information supplied by the system user, or generated automatically by analyzing the input information, which is used in selecting an encoding format and/or encoding quality level, comprises such things as: quality information, intended use information, image source information, and data storage limitation information. In some embodiments information used to make encoding format/quality decisions is obtained by querying the user in an interactive manner.

Quality information may indicate the quality of the source data and/or the desired minimum output quality level of the achieved data after being retrieved and/or transcoded. Intended use information may indicate, e.g., an archiving use, a distribution use such as digital TV distribution by cable, satellite, video-on-demand, CCTV, etc, or some other use such as medical application, video conference, surveillance, a drafting program, IP browser use, wireless delivery, e.g., radio broadcast, etc. Image source information may indicate the media on which the information to be archived was previously stored and/or a format in which the information to be archived was previously stored. Examples of media previously used to store information include digital audio tape, optical platter, laser disk, CD, DVD, analog VHS tape, floppy disk, etc. Examples of formats in which the information was previously stored include, e.g., VHS, motion film, NTSC, DV, etc.

For each encoding format which may be used, multiple encoding quality levels may be supported. For example, with regard to at least some encoding formats a lossless or near-lossless encoding quality level is supported, a contribution quality level is supported and a distribution quality level is supported. At the near-lossless quality level, the quality after decoding encoded data will differ from the input by not more than a small pre-selected amount. The contribution quality level provides a level of quality sufficient for production or post-production processing while distribution quality level corresponds to the quality level at which information is to be distributed to end users.

Prior to encoding, the particular encoding scheme is selected in accordance with the present invention to optimize a tradeoff between storage constraints if any are specified and end use quality requirements. The encoding quality level is also selected.

In order to use storage space efficiently, in various embodiments the encoding quality level is selected to be an encoding quality level which will preserve the image at a level of quality lower than the input level of quality but at least as high as the minimum level of image quality at which the image is to be preserved.

In other cases where a storage constraint is specified, after selection of an encoding format the quality level will be selected to be the highest quality level possible given the data storage constraint.

In cases where preservation is the goal, the encoding format and encoding quality level are frequently selected to insure that the input image and/or audio quality is adequately preserved. In fact, where image enhancement operations are performed as part of an image processing operation prior to encoding, a stored image may be stored at a quality level which is better than the input quality level.

Prior to encoding, the data to be archived may be analyzed to determine such things as coding complexity and to create true motion vectors which indicate actual differences between images in a sequence of images to be encoded. The true motion vectors may differ from those created by the selected encoding scheme. Encoding complexity information, true motion vectors and other information are included with the encoded information generated by encoding the information to be archived. The encoding complexity information is used, in various embodiments, to select encoded images and/or transcoded images to be previewed. In such embodiments images with high levels of coding complexity are selected for preview purposes since they give some indication of the worst case encoding result. Encoding complexity information, content information, true motion vectors and other information not normally encoded in a set of encoded information but which are included in an IAF file in accordance with the invention are used in various embodiments to suggest transcoder output formats. The suggested transcoder output formats may be presented as a list to a system user from which the user may make a format selection.

The method of the present invention and the use of an intermediate file format eliminates the need for repeated capture of the same material for transfer to a multiplicity of end-user formats. It also eliminates the need to store the source material and/or copies of the material in a plurality of application formats. This is made possible by the use of an intermediate coded format that is amenable to indexing and transcoding, i.e., conversion to a different coded format.

Since the archiving method of the present invention is based on a single capture of source material regardless of the number of different output formats to be supported, the time and cost of this labor-intensive step is reduced as compared to systems which include a separate capture operation for each supported output format.

In accordance with the present invention indexing and the creation of metadata can be decoupled from the operation of encoding audio/video information to be archived. In accordance with the present invention, subsequent to encoding, the encoded material can, and in various embodiments is, catalogued and indexed to create a database of metadata. Indexing can be performed multiple times after encoding, e.g., three or more times. The indexing process involves fully or partially decoding encoded data to be indexed and performing an indexing operation thereon to generate metadata in the form of indexing information. The metadata includes various descriptive information about the contents, format, etc., of the data being archived. Generated metadata is incorporated into the corresponding IAF file.

Each IAF file includes the metadata information in the file in a manner which allows the metadata to be used for the efficient computer-assisted search and retrieval of archived information also included in the IAF file. In addition to being stored in the IAF files, the metadata is used to create indexes into the IAF files to facilitate fast access to the archived material in the IAF. The generated indexes represent additional metadata which may, and in various embodiments is, incorporated into the relevant IAF files. The indexing metadata associated with each archive file is also used to create a global index for an archive including multiple IAF files. Thus, in at least some embodiments, the indexing metadata stored in individual IAF files is duplicated, e.g., copied, to a global archive database which can be used to identify IAF files to be accessed in response to user retrieval requests and/or searches.

Since, in various embodiments, indexing is done after encoding of the information to be archived, the indexing and creation of metadata need not be performed at the rate of encoding. Thus, in at least some embodiments indexing is performed at a rate which is considerable lower the rate at which data is created, e.g., at less than half the data creation rate.

Since indexing can be performed independently of encoding, if desired, indexing and metadata creation can be performed using a separate system dedicated to the indexing process. Notably, at any time after encoding of the archived audio/video information the metadata and generated indexes can be updated as the need arises or as the desirability of additional search fields becomes apparent. Newly generated metadata can be added, e.g., appended, to an IAF file without modifying the existing metadata in the file or the encoded archived information itself.

Information in an archive of IAF files created in accordance with the invention can be searched, retrieved, and delivered to the end-user in any of a wide range of user specified formats. Multiple output formats are supported by the use of transcoding, e.g., re-encoding the archived information into the desired output formats as required. In this manner, retrieved information can be delivered as a low-resolution, low-bandwidth stream suitable for browsing, or as any other desired format with the quality and resolution being dictated by the end-user application at a time subsequent to the creation of the archive.

Various additional features and advantages of the present invention will be apparent from the detailed description which follows.

DETAILED DESCRIPTION

As discussed above, the present invention is directed to methods and apparatus for the archiving, storage, retrieval and distribution of audio, video and/or other types of data.

Figure 1:
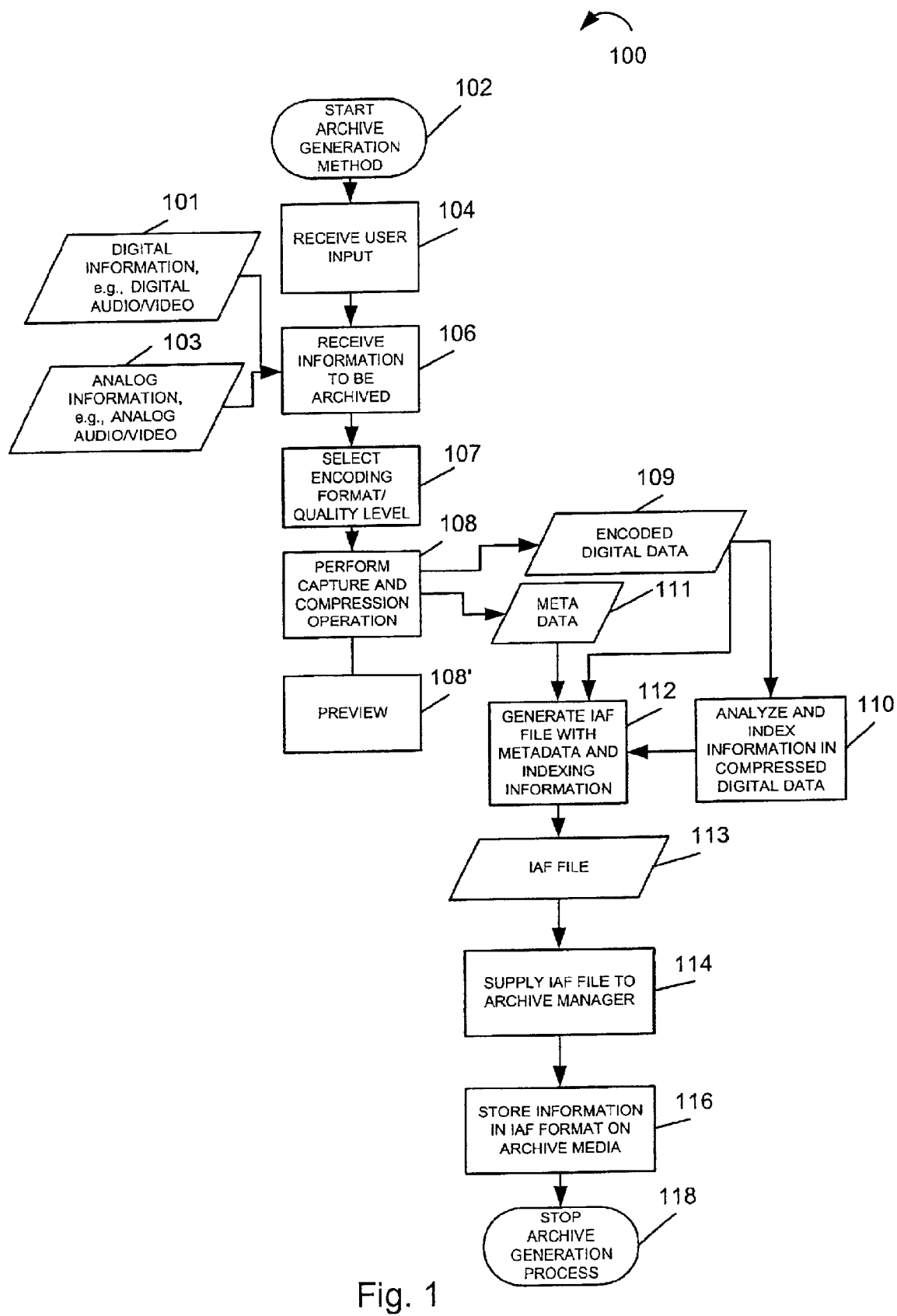
FIG. 1 illustrates an exemplary method for generating an archive of audio and/or video information in accordance with the present invention.

FIG. 1 is a flow chart 100 illustrating the steps of an archive generation method of the present invention. The method may be implemented using systems such as those illustrated in FIGS. 3 and 9 which will be discussed in detail below.

The archive generation method begins in step 102 wherein the archive generation process is started. Then in step 104 user input is received from an archive system user. The user input indicates, e.g., one or more application formats to be supported, the minimum output resolution to be supported, the user's desire to minimize loss in audio or image quality, the user's preference for a particular level of data compression and/or user specified data constraints.

Next, in step 106, the information, e.g., audio and/or video information to be archived is received. The information may be digital information 101 and/or analog information 103.

From step 106 operation proceeds to step 107 wherein an encoding format and encoding quality level to be used is determined as a function of various input information and/or information generated by analyzing the received information to be archived. The encoding format is selected from a family of supported encoding formats.

The IAF is a family of standard digital audio/video formats and associated encoding profiles and/or levels, such as MPEG, JPEG, DV, and/or others with one or more quality levels being supported for various formats. The IAF supported formats allow metadata to be incorporated with the encoded A/V data, e.g., as auxiliary data, without interfering with the ability of a decoder which supports the standard encoding format to decode at least the encoded A/V data included in the created file. The encoding technique and related encoding parameters used to generate an IAF file may be selected to be of sufficient quality, resolution, frame rate, etc., to ensure that any downstream transcoding or reformatting will yield substantially the same result had the original material been coded directly to that end format. In one embodiment, in order to achieve this, the archive encoding format selected for any given archiving operation is chosen to be the best of, or better than, any anticipated downstream format requested or required by the archiving system user. If preservation is a requirement, then the encoding format may be one of digitization with no compression, lossless compression, or near-lossless compression. In other cases, the encoding format used to generate an IAF file will he selected from a group of supported IAF encoding formats to provide the best tradeoff among criteria such as the degree of visual loss which is acceptable, storage requirements, anticipated use, and other user preferences or requests.

The encoding format used in any particular application is determined from information provided by the archive system user, data received with the information to be archived, and/or information generated by analyzing the information to be archived. Preexisting format information and input image quality information are well suited for determination from automated analysis of input data. Content information may also be determined by an automated analysis operation prior to encoding. Information supplied by the system user, or generated automatically by analyzing the input information, which is used in selecting an encoding format and/or encoding quality level, comprises such things as: quality information, intended use information, image source information, and data storage limitation information. In some embodiments information used to make encoding format/quality decisions is obtained by querying the user in an interactive manner.

Quality information may indicate the quality of the source data and/or the desired minimum output quality level of the achieved data after being retrieved and/or transcoded. Intended use information may indicate, e.g., an archiving use, a distribution use such as digital TV distribution by cable, satellite, video-on-demand, CCTV, etc, or some other use such as medical application, video conference, surveillance, a drafting program, IP browser use, wireless delivery, e.g., radio broadcast, etc. Image source information may indicate the media on which the information to be archived was previously stored and/or a format in which the information to be archived was previously stored. Examples of media previously used to store information include digital audio tape, optical platter, laser disk, CD, DVD, analog VHS tape, floppy disk, etc. Examples of formats in which the information was previously stored include, e.g., VHS, motion film, NTSC, DV, etc.

As mentioned above, for each encoding format which may be used, multiple encoding quality levels may be supported. For example, with regard to at least some encoding formats a lossless or near-lossless encoding quality level is supported, a contribution quality level is supported and a distribution quality level is supported. At the near-lossless quality level, the quality after decoding encoded data will differ from the input by not more than a small pre-selected amount. The contribution quality level provides a level of quality sufficient for production or post-production processing while distribution quality level corresponds to the quality level at which information is to be distributed to end users.

In order to use storage space efficiently, in various embodiments the encoding quality level is selected to be an encoding quality level which will preserve the image at a level of quality lower than the input level of quality but at least as high as the minimum level of image quality at which the image is to be preserved.

In other cases where a storage constraint is specified, after selection of an encoding format the quality level will be selected to be the highest quality level possible given the data storage constraint.

In cases where preservation is the goal, the encoding format and encoding quality level are frequently selected to insure that the input image and/or audio quality is preserved to the extent possible. In fact, where image enhancement operations are performed as part an image processing operation prior to encoding, a stored image may be stored at a quality level which is better than the input quality level.

One of the features of the present invention is the automated selection of a video/audio encoding format and associated parameters suitable for an indicated user or application. Alternatively, the system can suggest formats/encoding levels to a system user for their review and approval.

Encoding format/level selection can be done base on an analysis of needs and features, or as a lookup in predefined tables, or as a learning process. The transcoder, discussed below, may include similar functionality for making transcoding format/quality level selections and/or suggestions.

In the exemplary capture and compression module discussed below, an encoding format and/or encoding parameters appropriate for the best of a number of anticipated applications, subject to a minimum threshold of high quality suitable for an archive may automatically be determined.

Some exemplary pairings between use or application (on the left) as specified by received input or data analysis and the selected or suggested video encoding format/level (on the right) are:

Digital TV distribution use→MPEG-2 MP@ML format/level

Digital TV production use→MPEG-2 422P@ML

High definition TV→a high definition mode of MPEG-2

Medical applications→lossless or near-loss encoding

Head-and-shoulders, videoconference, surveillance, etc, →MPEG-1 or H.263

Browsing delivery by transcoder→a browsing format such as Windows Media, Real, or QuickTime with bitrate set according to user's capabilities and bandwidth Wireless delivery→MPEG-4

Information on previous encoding formats and/or data storage medium used to store the information being processed may also be considered and used when making an encoding format selection in accordance with the present invention.

As mentioned above, analysis of the information to be encoded may be performed as part of the encoding format selection process. Information generated as part of the analysis operation may include encoding complexity information expressed in terms of a number of different levels, motion estimates between frames, format and/or content analysis. Some or all of this information may be used as metadata which can be added, e.g., tagged, to the encoded data created as part of the encoding process.

A capture and compression operation is performed on the received information to be archived in step 108. The capture and compression operation 108 involves an A/D conversion in the case of analog input. Digital input or digital data produced by an A/D conversion operation is then followed by an encoding process using the encoding format/level determined in step 107. As part of the encoding process, the digital data is encoded according to a format and to a quality level determined as a function of various input information and/or information generated by analyzing the data to be archived. The encoding operation produces encoded digital data 109 which is in an IAF encoding format.

Optional preview step 108' can be used to preview images represented by the encoded digital data 109. Rather than preview all images or randomly select images for preview, in one embodiment images which are identified in the above discussed analysis operation, as being complex from an encoding perspective, e.g., as indicated by the images being assigned to the top encoding complexity level, are used for preview purposes. In this manner the result of the most complex images to encode, which are likely to result in the worst image quality, can be identified and previewed. If the preview in step 108' indicates an unacceptable image quality a user can select a different encoding format to be used for archiving purposes.

In addition to generated encoded data 109 in the selected IAF encoding format, the capture and compression operation produces metadata 111 which may includes, e.g., encoding complexity information (generates as part of the encoding operation or the analysis performed to select the encoding format), true motion vectors (which differ from motion vectors created according to the selected encoding format), archive creation date/time information, encoding format information and/or various input, e.g., descriptive information and/or encoding parameters, received from the user. After encoding, the encoded data 109 is supplied to an analysis step 110 wherein the information is processed and analyzed to generate indexing information, e.g., additional metadata. Processing may include decoding of the encoded image data while the analyzing may involve, e.g., examining the decoded image data to determine pictorial content. The generated indexing information can be used to facilitate subsequent accessing of the encoded data 109 and computerized searching operations. The metadata generated in step 110 is supplied to an IAF file generation step 112 which also receives the metadata 111 and encoded data 109 output by step 108.

In step 112, the metadata from steps 108 and 110 and the IAF encoded data 109 is processed to generate an IAF file 113.

The IAF file 113 includes the compressed audio/video bitstream plus ancillary metadata that describes, tags, or otherwise specially marks the bitstream or bitstreams which, along with the metadata, are multiplexed into an IAF file.

In accordance with various embodiments of the invention, the IAF file 113 has the property that it can be accessed as a self-contained archive for a particular piece of audio-video material or as content plus local indexing and metadata information that is just one part of a complete archive of a number of stored audio-video elements that are all searchable and retrieved through a global database manager connected to the whole archive or some subset thereof.

Metadata stored in the IAF file 113 is also directly editable, spliceable and extensible while the A/V content of an IAF file can, in some cases, be modified or appended to. Furthermore, data streams in an IAF file 113 and streams can be separated or combined, with the result being another compliant IAF file or additional entry within an existing IAF file.

In accordance with the present invention, the metadata and other ancillary information incorporated into an IAF file may be in a proprietary format. However, this data is embedded into the bitstream which makes up the IAF file using fields normally ignored by a standard decoder. Thus, the IAF file 113 has the further property that this container of audio/video material is decodable by a standard decoder thereby avoiding the risk of loss of access, and hence loss of data, that would occur with a proprietary format and associated proprietary software.

The IAF file is supplied in step 114 to an archive storage manager which is responsible for placing the file in the archive. Then in step 116 the IAF file is stored on the archive media, e.g., for future retrieval. In step 118, after the IAF file has been stored, the archive generation process stops.

Figure 2:
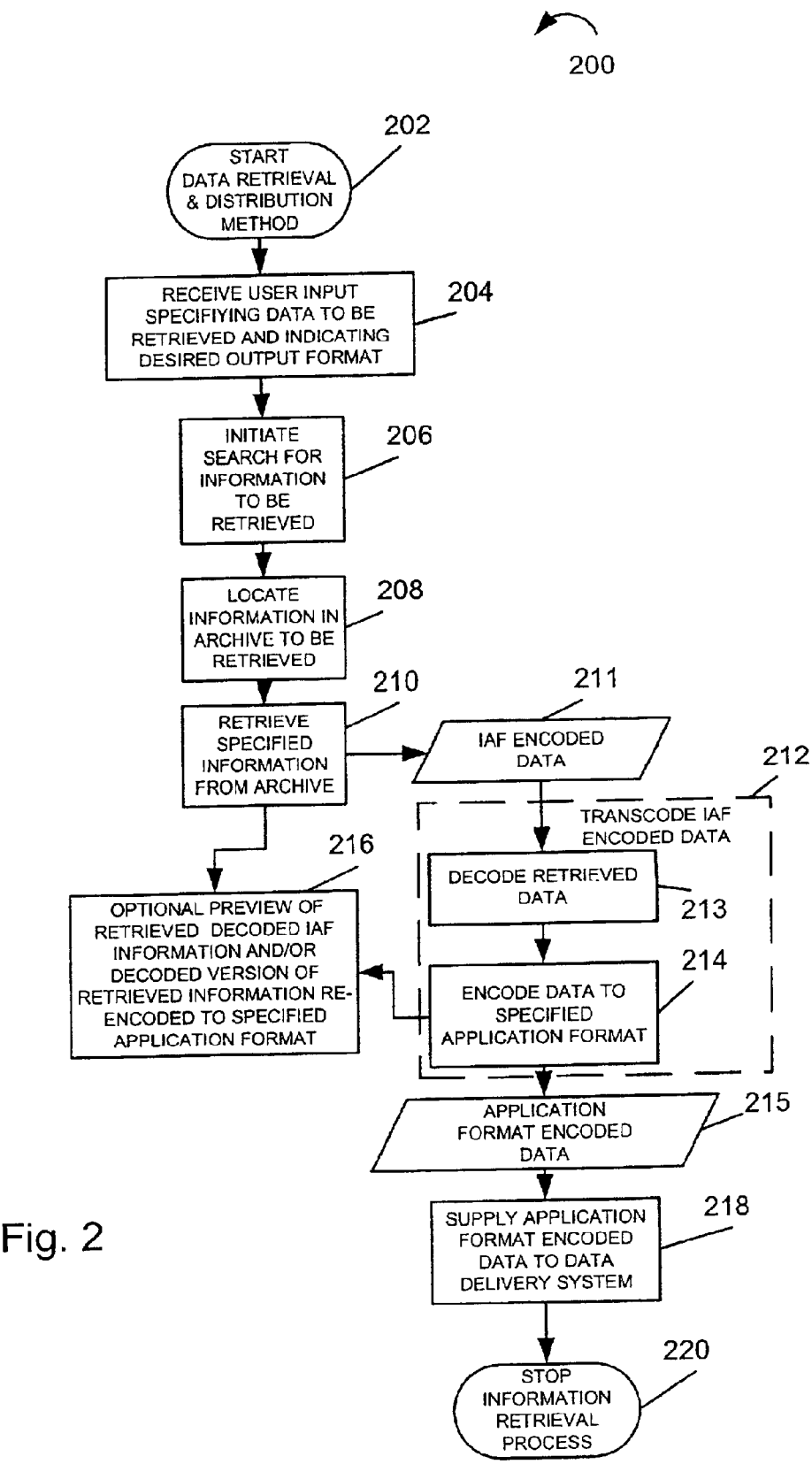
FIG. 2 illustrates an exemplary method of the present invention for retrieving and distributing data stored in an archive of the type generated by the method of FIG. 1.

FIG. 2 illustrates a flow chart 200 showing the steps of a method of retrieving and distributing data stored in an archive in accordance with the present invention. As illustrated, the retrieval and distribution method begins in step 202, e.g., with an archive system such as the system illustrated in FIG. 3, being readied for the retrieval process. From step 202 operation proceeds to step 204 wherein user input specifying data to be retrieved, and input indicating the desired output format, is received. Data retrieval information may be obtained from a user as part of an archival browsing process where the user previews portions of archived data and selects data to be retrieved or by the user providing some information, e.g., file name, content description, or other indexed information which can be used to identify archived data for retrieval purposes.

From step 204 operation proceeds to step 206 wherein a search of the archive is initiated, e.g., by an archive management module, using the information obtained from the user. In step 208 the information to be retrieved is located as the result of the search. Using the location information, in step 210, e.g., the user specified information, in the form of IAF encoded data 211, is retrieved from the archive. In optional step 216, the system user is provided the opportunity to preview the retrieved data prior to, or in parallel with, the retrieved encoded data being subject to transcoding in step 212.

In transcoding step 212, the retrieved IAF format data is converted to the output specified by the user. Prior to the user specifying the output format the transcoder may or trancoder control circuitry may suggest to the user one or more recommended output formats. The output formats may be based on end use and/or distribution channel information. The formats and/or quality levels to be recommended may be selected in the same manner as discussed above in regard to selecting an appropriate IAF encoding format. Transcoder suggested data output formats may be displayed to the user in the form of a list from which the user can select one or more desired output formats.

In most cases transcoding to the user specified output format(s) will involve decoding the retrieved data 211, in substep 213, and recoding the data to the format specified by the user, as in substep 214. In cases where the IAF format is the same as, or similar to, the format specified by the user decoding of the data may not be necessary to place it into the format specified by the user. The result of transcoding step 212 is application format encoded data, i.e., data coded to the format specified by the user, which in step 218 is supplied to a data delivery system, e.g., cable system, television broadcaster, Internet service provider, etc.

With the data selected by the user having been retrieved and delivered in the user specified format, the information retrieval process halts in step 220.

Notably, while the retrieval process of the present invention has been described with the user selecting a single output format, in some embodiments a user may specify multiple output formats for a single set of retrieved data. In such embodiments, in transcoding substep 214 the retrieved decoded data is encoded into each of the formats specified by the user. This results in the same retrieved data being converted into multiple output formats without the need for multiple capture operations. Alternatively, to support multiple output formats the retrieval method 200 may be performed repeatedly with the same data being retrieved each time but a different output encoding format being selected by the user each time.

Figure 3:
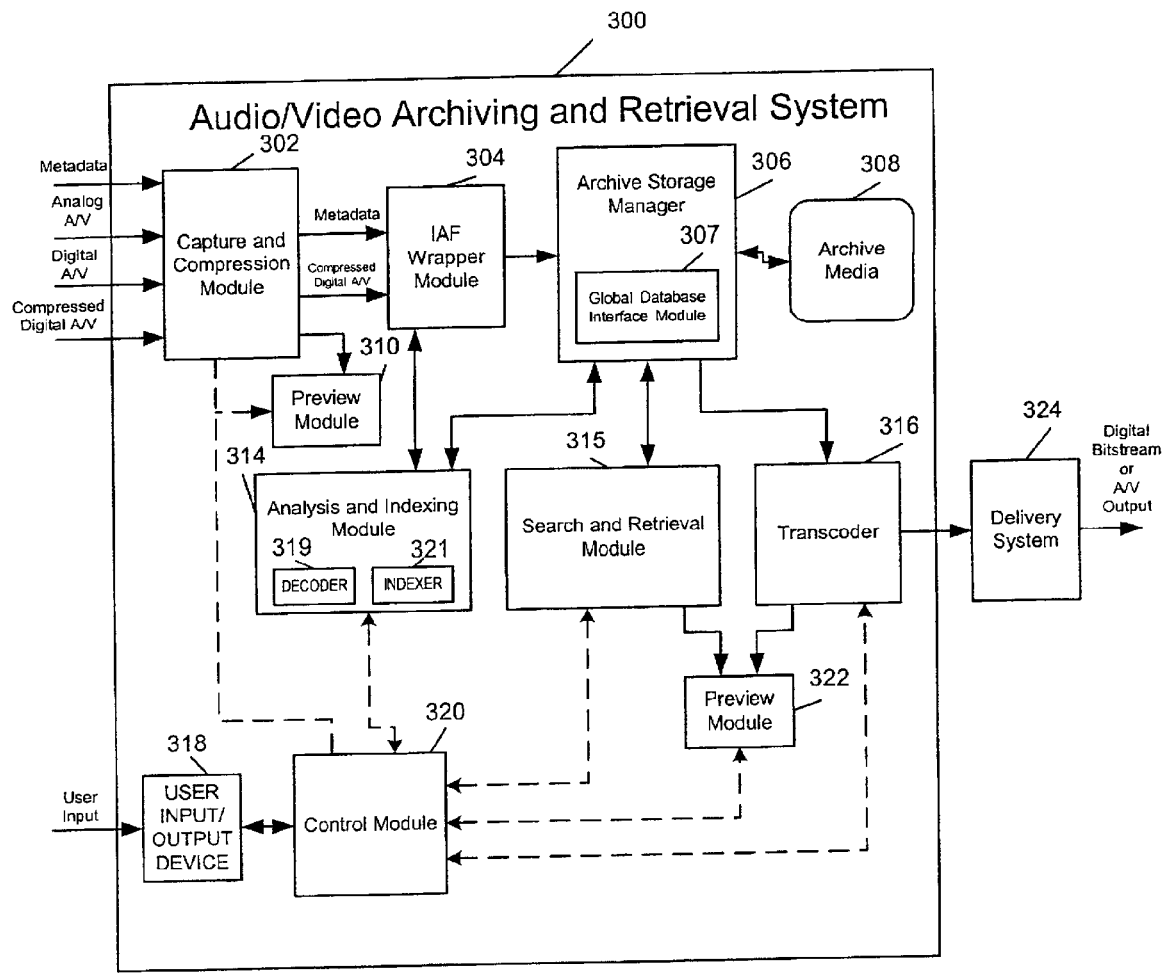
FIG. 3 illustrates an audio/video archiving and retrieval system implemented in accordance with one embodiment of the present invention.

FIG. 3 illustrates an audio and/or video archiving and retrieval system (AVARS) 300 of the present invention suitable for use in performing the methods illustrated in FIGS. 1 and 2. The AVARS 300 is illustrated in FIG. 3 coupled to a delivery system 324. The delivery system 324 may be anyone of a plurality of known communications systems capable of delivering digital and/or analog A/V signals output by the AVARS 300.

The AVARS 300 comprises a control module 320, a capture and compression module 302, IAF wrapper module 304, archive storage manager module 306, a first preview module 310, an analysis and indexing module 314, search and retrieval module 314, transcoder 316, a second preview module 322, and a user input/output device 318. Each of the modules used in the AVARS 300 may be implemented using hardware, software, or a combination of hardware and software.

The control module 320 is responsible for controlling general operation of the AVARS 300 in response to input received from a system user and data to be processed. In particular, the control module 320 is responsible for selecting, based on user supplied information, the particular encoding scheme to be used for encoding received input, out of a plurality of supported IAF supported encoding formats. The control module 320 is also responsible for controlling the indexing of data as part of the archiving process, data retrieval, and transcoding operations, as well as other processing operations.

Figure 4:
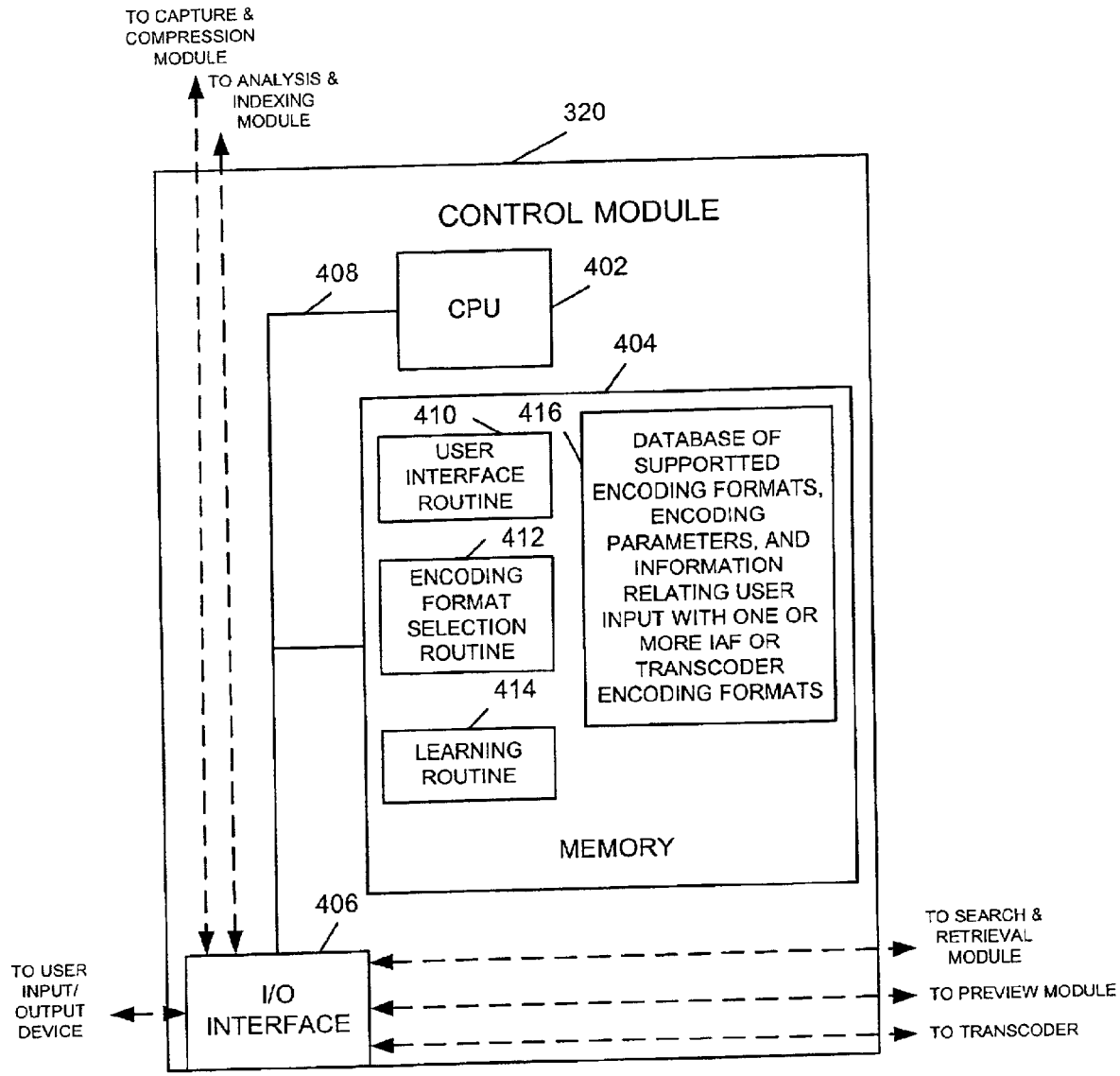
FIG. 4 illustrates a control module suitable for use in the system illustrated in FIG. 3.

FIG. 4 illustrates an exemplary control module 320 suitable for use as the control of the AVARS 300. As illustrated the control module 320 includes a central processing unit 402, memory 404 and an input/output (I/O) interface 406 which are coupled together by bus 408. The I/O interface couples the control module's various components to external modules and devices such as the user input/output device 316, capture and compression module 302, analysis and indexing module 314, search and retrieval module 314, first and second preview modules 310, 322 and transcoder 316.

Control module operation is controlled by CPU 402 under direction of various routines stored in the memory 404. The stored routines include a user interface routine 410, encoding format selection routine 412 and learning routine 414. In addition to various routines, the memory 404 includes information 416 used by the routines 410, 412, 414. The stored information 416 includes a database of supported encoding formats which lists both IAF encoding formats and formats which may be generated by transcoding, various encoding parameters, and information relating user input with one or more supported IAF encoding formats and/or transcoder encoding formats, e.g., data output formats.

The control module 320 has an intelligent user interface 410 and learning routine 414, which are used to choose the specific type of compression to be performed as part of IAF encoding and parameters needed to control the selected encoding circuitry. The control module 320 ensures that the type of compression used, if any, maintains sufficient quality of the archived information that the anticipated end-user application(s) specified by the user prior to, or as part of the archiving process, can be supported using the archived information. The single capture technique of the present invention made possible by the control module's selection of a suitable intermediate file encoding format, avoids the need for additional access to original source material thereby avoiding the added cost, time, and wear on that material. The intelligent user interface which can prompt the user for information and receive information via user input/output device 318 can be as simple as the user directly selecting format and parameters from a list, or a more sophisticated question and answer approach, or an automatic selection based on anticipated end-user application. In some embodiments the control module uses a database of pre-specified formats and parameters to determine the IAF encoding format while in other embodiments it learns from user input, e.g., encoding format and parameter selections, and subsequently builds and refines such a database. In various embodiments the user interface queries for specific parameters, for anticipated use, and/or storage availability. In other embodiments, there is no query at all, in which case parameters are preset or input from an automation script allowing unattended capture and compression of information to be archived.

The control module 320 is where the intelligent user interfaces and algorithms for sophisticated control of the individual modules 302, 304, 306, 314, and 315 reside. There may be one or more copies of the control module as required by the specifics of the system implementation. For example, if the capture module 302 and transcoder 316 are independent of one another or in different locations they can each include their own control module 320. In the control module 320 there are features common to multiple modules and features specific to each module as applicable. The control module:

(a) Intelligently controls the other modules according to user input or an automation script and does things such as choose modes, set parameters, make decisions, steer data, etc.

(b) Collects information and statistics from the other modules and process that information along with the user or automated input to further control the modules and to report back on their performance and the performance of the system as a whole.

(c) Analyzes the existing metadata, permits the input of additional metadata as well as information used for making encoding format/level suggestions and decisions, and can output new metadata to be added to the archive record.

(d) Performs additional operations depending on the mode of operation.

Two supported modes of operation are a user-driven mode of operation and an automated mode of operation. In the user-driven mode, the control module intelligently interacts with the user in one or more of the following ways:

(a) The user selects modes and parameters directly.

(b) The user is queried for the specific modes and parameters.

(c) The user is queried about the content and its intended use, then appropriate modes and parameters are determined.

(d) The user selects from a collection of predefined profiles.

(e) The user is queried and the appropriate predefined profile is determined.

(f) The control module learns from the user and adapts accordingly.

The automation mode is driven by predefined profiles and/or a process of learning and adjustment as specified by the learning routine 414.

The capture and compression module 302 is one of the modules which operates under the direction and control of control module 320. The module 302 is responsible for receiving information, e.g., analog and/or digital A/V information to be archived, digitizing it if required, and for encoding the received information using the IAF supported encoding format, e.g., MPEG, JPEG, DV, etc., indicated by the control module 320. Data compression may, and in many embodiments is, performed as part of the encoding process. Encoding parameters supplied by the control module 320 are used to control the amount of data compression, if any, that is performed. Data compression may be loss-less, low-loss, or of a rate required to meet a control module 320 or user specified data constraint.

Figure 5:
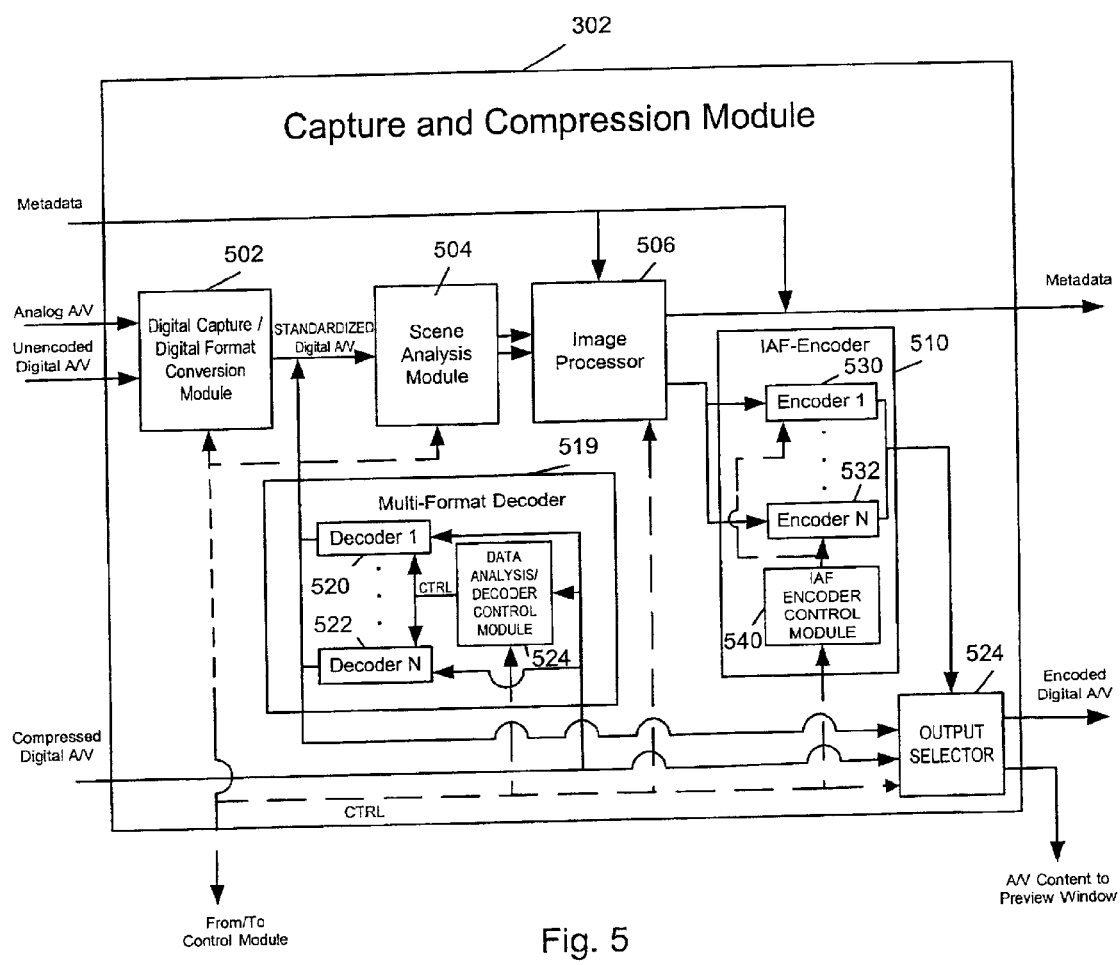
FIG. 5 illustrates a capture and compression module suitable for use in the system illustrated in FIG. 3.

FIG. 5 illustrates an exemplary capture and compression module 302 suitable for use in the AVARS 300. The module 302 includes a digital capture/digital format conversion module 502, scene analysis module 504, image processor 506, multi-format decoder 519, an IAF encoder 510 and an output selector 521. Analog audio and video is input to a capture device, e.g., sampling circuit included in module 502, and converted to digital form. The module 502 also includes an unencoded digital A/V input for receiving unencoded digital data. Such digital data is processed by formatting circuitry included in the module 502 to insure that it is placed in the same standardized format expected by downstream components that would be produced by the module's processing of analog input. The capture and compression module also includes a compressed, e.g., encoded digital A/V input which is coupled to the multi-format decoder 519 and an output selector 524. In the case where the input is already in a compressed IAF format, the output selector may, under the direction of control module 320 select to use the original input data as the compressed digital output of the capture and compression module 302. Whether or not the compressed digital A/V is in an IAF compliant format, it is supplied to the multi-format decoder 519 so, at a minimum, it can be processed for metadata generation purposes.

The multi-format decoder 519 includes a plurality of full or partial decoder circuits 520, 522 each of which is designed to decode data which has been encoded according to a different encoding scheme. For example, decoder 520 may be an MPEG decoder, decoder 522 a JPEG decoder, with other decoders supporting yet other encoding formats. While the received compressed input is supplied to each of the decoders 520, 522, the data analysis/decoder control module, working in conjunction with control module 320, determines the type of decoding to be used with any particular set of input data. With the type of decoding to be performed determined, the control module 521 enables via a control signal the appropriate one of the decoders 520, 522 so that one of the plurality of decoders is used to generate the decoded digital A/V data supplied to the scene analysis module 504 when encoded input data is being processed.

The unencoded digital data output by the digital capture/digital format conversion module 302 and multiformat decoder 519 are supplied as input to the scene analysis module 504. The analysis module 504 analyzes each frame in digital data for the purpose of classification according to such things as scene type or coding complexity. Frames are classified according to such things as complexity to encode, general characteristics of the frame, potential point of scene change, pictorial content, etc. The frames are tagged with the classification and the tag is associated with the encoded bitstream using the mechanism of metadata. The classification can be used to assist any further processing of the archive material and/or for selecting images to be previewed after IAF encoding or transcoding. One particularly important use of the generated metadata is by the transcoder in making encoding format output suggestions/recommendations and/or format selections.

In addition to the frame analysis and classification, other types of descriptive information about the source content are generated and output by the scene analysis module 504 in the form of metadata.

The results of the analysis performed by module 504 are metadata which can, and is, linked to the images to which it relates as part of an encoding process. At retrieval time, the metadata can be used to identify and retrieve frames with particular characteristics. During the capture and compression stage, some metadata is also captured or dynamically created. This metadata, along with the metadata created by the analysis module, is linked to and/or embedded into the archive file created from the A/V data being processed.

The metadata and processed digital data output by the scene analysis module 502 is supplied to an image processor 506 which can perform one or more image filtering and/or other processing operations on frames prior to encoding. A metadata output of the image processor 506 serves as the metadata output of the capture and compression module 502.

The processed digital data, e.g., A/V data output by the image processor is supplied to an IAF encoder 510 which supports multiple standard encoding formats, e.g., MPEG, JPEG which are supported by IAF. To support multiple encoding formats the IAF encoder includes a plurality of encoders 530, 532 with each encoder corresponding to a different encoding format. An IAF encoder control module 540 determines, in conjunction with the AVARS control module 320 which encoding scheme will be used for a given set of input data.

The use of the control modules to control the particular encoding scheme provides smart capture and encoding. The AVARS 300 includes intelligence in the form of control modules 320, 540 that enables it to choose an appropriate compression format and associated parameters based on user input or pre-defined profiles or learned behavior. The user can directly input specific parameters or there can be established a dialog whereby the user is queried about needs and concerns such as acceptable quality level, storage availability, and anticipated applications, from which the appropriate parameters are automatically determined. In addition or alternatively, the user can be queried about more abstract concepts such as general content description and anticipated use. The appropriate encoding format to be used for IAF file creation and parameters will be automatically generated from this dialog. There is also the capability to learn and automatically adapt parameters over large runs of captures and encodings.

Once encoded, the encoded data is supplied to output selector 524. Output selector 524, under the direction of control module 320, selects a source of encoded digital A/V to serve as the encoded digital A/V output by the capture and compression module 302. In the case where compressed digital A/V is input to the module 302, the output selector selects between the compressed digital A/V input and the output of the IAF encoder 510 to serve as the encoded A/V output of the module 302. The output selector further includes an A/V preview window to which it supplies decoded A/V or encoded A/V depending on the preview window device's needs as determined by the control module 320.

In the AVARS 300, the encoded digital data generated by the capture and compression module 302 and associated metadata are supplied to the IAF wrapper module 304. The IAF wrapper module 304 receives the compressed material and metadata and reformats as needed into the appropriate storage IAF package format to form an IAF file. The IAF wrapper module interacts with the analysis and indexing module 314 which is used to perform post encoding analysis. Encoded data being placed into IAF files is supplied to the analysis and indexing module prior to the IAF file including the encoded data being created.

The analysis and indexing module 314 receives audio/video material in compressed digital form, and uses a decompression, e.g., decoding circuit 319, to decompress the received data. It than analyzes and indexes the received data, e.g., using indexer 321, to create index information which can be used in searching and accessing the encoded data. The analysis and indexing module return the index information to the IAF module which is responsible for formatting it for inclusion in an IAF file with the corresponding encoded data. A second copy of the index information is passed to a global database manager 307 of the archive storage manager for use in creating or updating a global index into the full contents of the archive stored on the archive media 308. Because the indexer receives its input after compression, it can, and often does, run asynchronous to the capture and compression process. Thus the analysis and indexing module 314 can run faster or slower than the compression module 302, process the encoded data once or multiple times, at the current time or at some later time, as automatically determined or specifically requested by the user.

The analysis and indexing module 314 can also retrieve existing archived IAF file content directly through the archive storage manager 306 thereby allowing indexing or re-indexing to be done at any time, even after the encoded data is stored in the archive and is no longer available from the IAF wrapper module 304. Re-indexing allows new features of the archived information to be indexed well after creation of the initial encoded data file. The analysis and indexing, and further re-indexing, can be performed manually by a user coupled to the analysis and indexing module 314 via user input/output device 318 or can be performed in an automated fashion whereby the process is driven by an indexing routine that is predefined or adaptable to the task at hand. The analysis and indexing module also includes a learning algorithm that permits the indexing routine to adapt over several runs, e.g., based on feedback which includes at least some results from one of the indexing runs. Another way to set indexing parameters is by stored profiles selected according to anticipated end use of the material, where these can be selected manually or by the user and then automatically applied.

Processing by the IAF wrapper module 304, e.g., creating the correct wrapper, e.g., placing data in the correct file format, is accomplished by performing a formatting operation and adding any headers, additional metadata, and/or ancillary data as needed or desired before being output as an IAF file for storage. In addition, the wrapper module 304 can send the content to the analysis and indexing module 314 and receive back the indexing information which it can then link to and/or embed into the encoded material.

The output of the IAF wrapper module 304 is a self-contained archive entry, that is, an IAF file. The IAF file is supplied to the archive storage manager 306 for transfer to the archive media 308. The IAF file includes the bits needed for decoding and play back as well as metadata and indexing information sufficient to support later search and retrieval processes or other understanding or analysis of the material.

The IAF file or files generated by the IAF wrapper module are received by the archive storage manager 306 for storage on the archive media 308. The archive storage manage includes a global database interface module 307 responsible for creating and maintaining a global database including indexes used for accessing the various IAF files stored on the archive media 308. The archive storage manager controls both read and write access to the archive storage media. Within this component resides the global database interface module that controls all access to the master database in the archive. The global database interface module 307 adds the local records specific to each archive entry to the global database and updates any global entries in that global database. Database entries are delivered to requested processes for search across archive entries, search within entries, and then subsequent retrieval of requested material.

Figure 7:
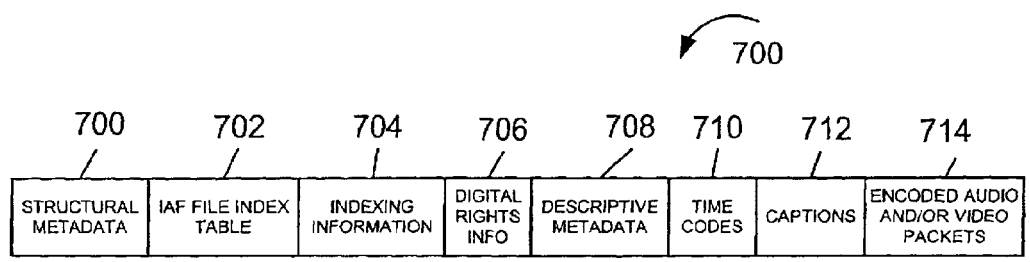
FIG. 7 illustrates an exemplary intermediate archive format (IAF) file generated in accordance with the present invention.

FIG. 7 illustrates an exemplary IAF file 700 which may be stored on the archive media 308 as part of an archive. The IAF file 700 includes structural metadata 700, an IAF file index table 702, indexing information 704, digital rights information 706, descriptive metadata 708, time codes 710, captions 712 and encoded audio and/or video packets 714. The descriptive metadata 708, time codes 710, and captions 712 may be interleaved with the actual data packets 714 as desired or useful.

An IAF file, in accordance with the present invention, comprises two or more of the following elements multiplexed into a single accessible data package.

One or more video streams, e.g., organized as a series of packets

One or more audio streams, e.g., organized as a series of packets

Still images

Graphics

Captions, e.g., text or closed captions associated with the video

Timecodes, e.g., as per SMPTE standard, these can be used for synchronization and as access points Database records (from indexing process)

Structural metadata, general information about the structure of the file content, the structure of the IAF file and the encoding, it includes such things as, e.g., title, author, date, topic global description, data encoding type, parameters, how many video streams are included in the file, how many audio streams, etc.

Descriptive metadata, e.g., detailed descriptions of the encoded file content

Index tables to facilitate efficient random access into the file and/or other maintenance and control information, the index tables may be implemented as, e.g., one or more time code to byte offset lookup tables Indexing information which is the local copy of the databse entry including information generated by one or more data indexing operations which is to be used to support search and retrieval operations Digital rights information which includes information for digital rights management such as ownership, encryption, distribution rights, etc.

Each such IAF file, serves as an entry in the archive that is stored on the archive media.

The descriptive metadata, time codes, captions and audio/video stream fields of an IAF file may appear several times in the file and may be interleaved with each other if desired and/or as necessary to keep the fields and particularly descriptive metadata close to the audio/video content to which it pertains.

Figure 8:
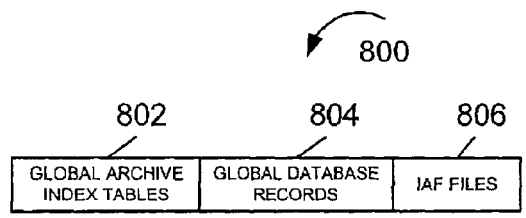
FIG. 8 illustrates an exemplary archive including multiple IAF files.

FIG. 8 illustrates an exemplary archive 800 created in accordance with the present invention. The archive includes one or more global archive index tables 802, global database records 804 and IAF files 806. The global archive index tables 802 are tables which include information which enables random access into the archive elements such as the global database, IAF files, and may include specific byte offsets into those files to access specific data. The global database records 804 include copies of the indexing information included in each of the IAF files in the archive.

Once an archive has been created and stored on the archive media 308, data may be searched, retrieved from the archive, and delivered in one or more formats, e.g., encoded or unencoded formats, to the delivery system 324.

In order to support data retrieval and outputting in one or more formats, the AVARS 300 includes search and retrieval module 315, transcoder 316 and preview module 322 in addition to the archive storage manager 306. The search and retrieval module 315 interacts with a user via control module 320 and user input/output device 318. The search and retrieval module has the ability to access and retrieve data from the archive by interacting with the archive storage manage which is responsible for overseeing the actual retrieval of data from the archive. In response to retrieval command from the search and retrieval module 315, the archive storage manager 306 will deliver retrieved IAF files to the transcoder 316 for further processing.

The search and retrieval module 315 allows a user to perform searches over the archive entries and within entries, delivers low-resolution, low-bandwidth preview audio-video bitstreams for browsing preview to the preview module 322, and displays those frames as requested by the user. Images can be selected by a user for retrieval and output by a unique frame number assigned to the frame as part of the archive index creation process or can be indicated by content. The search and retrieval module 315 includes search routines and/or processing circuitry suitable for accessing database and/or file indexes to identify frames based on user specified content. The search and retrieval module also includes control circuitry capable of initiating the display of identified frames with or without associated audio.

Data selected to be retrieved and output is read from the archive by the archive storage manager 306 and supplied to the transcoder 316 for conversion, if required, into the appropriate output format, e.g., one or more output formats specified by a system user. Operation in terms of output format control may be by way of user input supplied to control module 320 which interacts with the transcoder 316.

Figure 6:
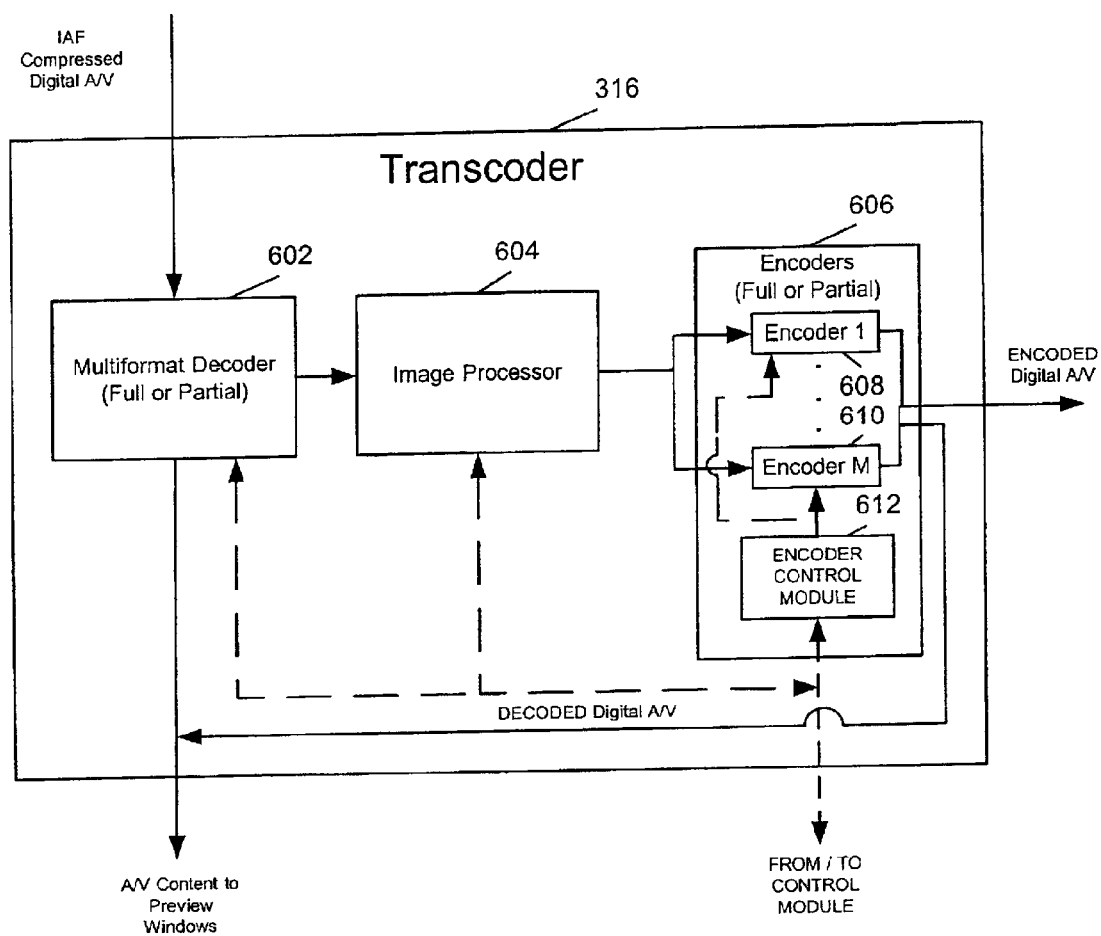
FIG. 6 illustrates a transcoder suitable for use in the system illustrated in FIG. 3.

FIG. 6 illustrates an exemplary transcoder 316 which may be used in the AVARS 300. As illustrated the transcoder includes a multiformat decoder, image processor and encoder circuitry 606 which supports a plurality of encoder formats. The multiformat decoder receives IAF encoded digital data, e.g., one or more retrieved IAF files. It performs a full or partial decoding operation on the received data under control of signals from the control module. Decoded A/V information is supplied to the second preview module 322 for optional viewing of retrieved data and to an image processor 604 for processing of the decoded image data prior to re-encoding by one or more of the encoders 606.

The image processor 604 performs one or more image filtering operations or other image processing operations on the decoded image data under the direction of the control module 320 prior to the processed image data being supplied to encoder circuitry 606. Encoder circuitry 606 includes a plurality of M encoders 608, 610 each supporting a different encoding format. An encoder control module 612 interfaces with the AVARS control module 320 to determine which encoders 608, 610 should be enabled based on the user specified output format(s) and encoding parameters such as resolution and output data constraints. When multiple encoded output formats are specified, the encoder 608, 610 supporting each of the specified formats will be enabled. In the case where the user selected output is similar to the retrieved IAF file format only partial decoding and re-encoding may be required to convert the retrieved file into the user specified output format. Accordingly, some of the encoders 608, 610 may be partial as opposed to full video encoders.

As part of the encoding process performed by the encoders 608, 610, encoded data may be decoded as is known in the video encoder art. The decoded video data produced from the video data encoded to the output format may be supplied to the second preview module 322 to allow the user to view the retrieved and transcoded data as it would appear to an end user receiving the data. Encoded digital data generated by the transcoding operation is output by the enabled encoders 608, 610 to the delivery system 324.

Thus, the transcoder 316 is used for accepting retrieved material in IAF format and transcoding, e.g., digitally converting the bitstream format, to any explicitly requested delivery or to an intelligently determined format based on information provided by a user or set by an automated process. This component is capable of changing archived material into any end-user format on demand and in real-time. The transcoder inputs IAF compressed data, decodes according to its format, processes the frames as necessary, then re-encodes into one or more output compressed formats. The user interacts with this component through an interface controlled by control module 320 that can be as simple as the direct selection of format and parameters to transcode, or a query mechanism that can choose the format and parameters appropriate for the anticipated use of the material, or can choose the format and parameters as preset for particular applications, or can run in an automated fashion with minimal user input. There is also a learning algorithm in this component so it can adapt over time to the needs of the user and applications. There is also a mechanism for selecting and previewing the transcoded material before the entire content is converted. This mechanism includes a user interface for selecting what frames to transcode and display and then interactively modify settings and parameters until the desired result is achieved. Additional intelligence allows for the transcoding and display to be done not just from the beginning of the material, but from key frames within the material that can be explicitly chosen by the user or automatically found according to criteria such as content or complexity of encoding. The tags that find these critical frames are those put in by the capture and compression component.

The output of the transcoder and the final delivery of retrieved archived information by the delivery system 324 may be as a compressed bitstream, uncompressed digital audio/video, or analog audio/video, plus additional descriptive material derived from the metadata stored in the archive.

The delivered material can be in any of several forms, including but not limited to a digital file written to some removable storage, analog material written to tape, digital delivery over a network, delivery through other types of transmission, or just analog (or digital) delivery to a display device. The delivered material may comprise individual elements within an archive or a combination of elements presented in a synchronized way.

In various embodiments the transcoder 316 and/or the control module 320 has intelligence that enables it to choose an appropriate compression format and associated parameters based on user input or predefined profiles or learned behavior. The user can directly input specific parameters or there can be established a dialog whereby the user is queried about needs and concerns such as acceptable quality level, deliver requirements, and anticipated applications, from which the appropriate parameters are automatically determined. Alternatively, the user can be queried about more abstract concepts such as general content description and anticipated use and the appropriate encoding format and parameters will be automatically generated.

Another feature of the transcoder 316 and/or control module 320 is the ability to assist the user in assessing the quality and suitability of a transcoding format by allowing the user to preview a sample transcoding of some of the requested material via interaction with preview module 322. The representative piece is intelligently chosen to show the user how the transcoding will affect specific critical frames of the material. This is accomplished using the characteristic analysis and tagging done by the aforementioned smart capture and encoding. The tags allows the transcoder 316 to display the results of transcoding those frames with special relevance, e.g., hard-to-encode frames will show what the worst frames are expected to look like, important scene types, as perhaps specified by the user, can be checked for quality, and so on. Other intelligence in the transcoder 316 is the ability to allow the user to request transcoding and display of material not by specific frame numbers but by descriptions of the content. Yet another feature of the transcoder is the use of metadata, put in by other elements of the system, that assists the transcoding to be better or faster. For example, time is saved if statistics gathered by an earlier encoding process are made available to the transcoder 316 instead of it having to regenerate these. Provision is made for the inclusion in the archive and subsequent presentation to the transcoder 316 of various types of proprietary information to assist the smart transcoder perform its task.

Figure 9:
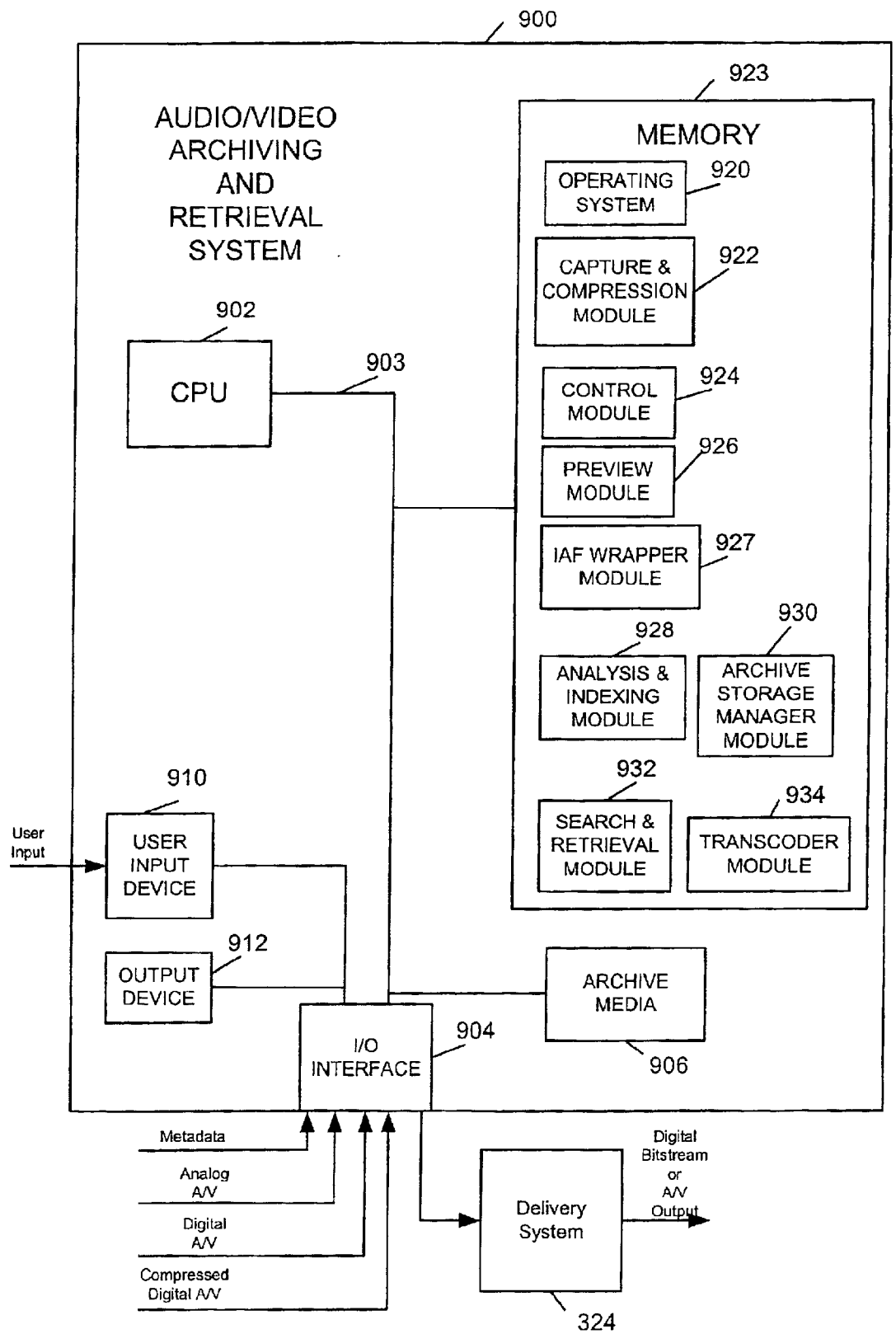
FIG. 9 illustrates an audio/video archiving and retrieval system implemented in accordance with another embodiment of the present invention.

As mentioned above, the archiving and retrieval methods of the present invention can be implemented using software executed on a computer. FIG. 9 illustrates a computer based AVARS 900. The AVARS 900 includes a CPU 902 for executing routines stored in memory 923, a bus 903, a user input device 910 for receiving user input, an output device 912, e.g., display, an archive media 906 and an I/O interface 904. The I/O interface is responsible for receiving input from external sources and for outputting information, e.g., signals and/or files, generated by the AVARS 900. The I/O interface may receive one or more of the following: metadata, an analog A/V signal, encoded digital A/V signal and user input. The I/O interface 904 outputs retrieved and transcoded A/V signals to the delivery system 324.

The AVARS CPU 902 is responsible for controlling operation of the AVARS 900 under direction of routines stored in memory 923. The stored routines which include software instructions are illustrated in the form of modules, e.g., operating system module 920, capture and compression module 922, control module 924, preview module 926, IAF wrapper module 927, analysis & indexing module 928, search and retrieval module 932 archive storage manage module 930, and transcoder module 934. Each of the modules is responsible for control the CPU 902 to perform functions which are the same as or similar to the functions performed by the previously discussed modules bearing the same name. In addition to the various modules memory 924 may include one or more sets of parameters and/or other encoding information.

In view of the above discussion it will be apparent that the archiving and retrieval techniques of the present invention can be implemented using any desired combination of software and/or hardware to implement the methods of the present invention. In addition, numerous variations on the above described methods and apparatus are possible without departing from the scope of the invention. For example, the encoding formats supported as part of the IAF group of formats may include a wide range of different encoding schemes relating to various applications for example, two or more of the following formats may be supported by an archive system as part of the group of IAF supported encoding formats.

Uncompressed digital audio/video
    MPEG-1 MPEG-2, MPEG-4
    DV, DVCAM, DVCPRO, DVCPRO-50, DCVPRO-HD
        (DV is the standard used for compressing and recording digital video onto 4 mm tape as used by digital camcorders)
    H.263, H.263++, H.26L
    JPEG, JPEG-2000, JPEG-LS, MJPEG, MJPEG-2000
    MPEG Audio, MP3, AAC, AC-3
        The following are for transcoder output only
    QuickTime
    Windows Media
    Real As the new formats become standards, additional formats may be supported as part of the IAF supported group of encoding formats.

Furthermore, with regard to the transcoder, user selection and/or automatic control may be used for selecting the encoding format and parameters (such as bitrate, frame size, frame rate, GOP structure, etc) used for re-encoding data, and also for selecting what frames to transcode, e.g., only a segment of the data in an IAF file may be transcoded and output. The user or data retrieval module can choose for transcoding purposes, frames based on frame's number in an encoded sequence or based on a content description, coding complexity, or a measure of moving average bitrate, or some other criteria. Furthermore in various embodiments a user can interact with the transcoder by, e.g., indicating a range of frames to transcode (e.g. by interacting with a preview window and the retrieval module), see the transcoding result in the preview window coupled to the transcode, move to another range of frames, see that output, and so on. The user interface supported by the retrieval module and preview window supports graphical tools for displaying tagged or calculated information along with the decoded IAF file data and for assisting a user with selecting test segments for transcoding and viewing the result. As part of the trancoding process, a user can interactively change encoding settings/parameters on the fly and see the effect of the changes in the preview window if desired.

As discussed above, analysis and metadata creation is done prior to and as part of the IAF data encoding process. For archived data which was not tagged prior to archiving, generation of such metadata may be performed at transcoding time and then stored in the archive file from which the encoded data, being processed by the transcoder, was retrieved.

What is claimed is:

1. A method of operating a system to process image data for storage and retrieval, the method comprising the steps of:
    analyzing said image data to be encoded to determine, for each image represented by the image data, a level of encoding complexity;
    encoding said image data according to a first encoding format to generate first encoded image data; and
    storing with the first encoded image data encoding complexity level information indicating at least one determined level of encoding complexity associated with the first encoded image data.

2. The method of claim 1, further comprising the steps of:
    performing an automated image content analysis operation on at least one image represented by said image data; and
    storing, with the first encoded image data, image content description information generated by performing said content analysis operation.

3. The method of claim 2, further comprising the steps of:
    receiving image content information from a user of the system; and
    storing, with the first encoded image data and the image content description information generated by performing said content analysis operation, the image content description information received from the system user.

4. The method of claim 1, further comprising the step of:
    selecting, based on the determined encoding complexity level information, an image represented by the first encoded image data, to be viewed after decoding.

5. The method of claim 4, further comprising the step of:
    decoding the encoded image data representing the selected image to generate decoded image data; and
    displaying the decoded selected image on a display device.

6. The method of claim 7, wherein said step of decoding the encoded image data is performed as part of said encoding step.

7. The method of claim 1, further comprising the step of:
    retrieving the first encoded image data and encoding complexity level information; and
    using the retrieved encoding complexity level information to identify at least one data format suitable for distributing an image represented by the first encoded image data, the identified data format being different from the first encoding format.

8. The method of claim 6, further comprising the step of:
    presenting to a user of the system a plurality of data formats suitable for distributing the image represented by the first encoded image data, the identified data format being one of said plurality of presented data formats;
    receiving from the user information selecting one of the presented data formats for use in distributing the image; and
    converting at least a portion of the first encoded image data from the first encoding format to the user selected data format.

9. The method of claim 1, wherein the step of analyzing image data to be encoded to determine, for each image represented by the image data, a level of encoding complexity includes:
    generating an activity measure for at least one image represented by said image data.

10. The method of claim 1, wherein the step of analyzing image data to be encoded to determine, for each image represented by the image data, a level of encoding complexity includes:
    generating a measure of the luminance variance throughout at least one image represented by said image data.

11. The method of claim 1, wherein the step of analyzing image data to be encoded to determine, for each image represented by the image data, a level of encoding complexity includes:
    generating a measure of the chrominance variance throughout at least one image represented by said image data.

12. The method of claim 1, wherein the step of analyzing image data to be encoded to determine, for each image represented by the image data, a level of encoding complexity includes:
    generating a measure of the motion between at least two complete frames, each frame corresponding to a different image.

13. The method of claim 1, further comprising:
    generating true motion vectors indicating motion between a first image and a second image;
    generating in accordance with the first encoding format, as part of said step of encoding said image data, a set of motion vectors indicating motion between said first image and said second image, said set of motion vectors including at least some motion vectors which are different form said true motion vectors; and
    storing the true motion vectors with the first encoded image data which includes said set of motion vectors.

14. A method of operating a system to process image data for storage and retrieval, the method comprising the steps of:
    analyzing said image data to be encoded to determine, for each image represented by the image data, a level of encoding complexity;
    encoding said image data according to a first encoding format to generate first encoded image data;
    storing with the first encoded image data encoding complexity level information indicating at least one determined level of encoding complexity associated with the first encoded image data;
    retrieving the first encoded image data and encoding complexity level information from the storage device;
    decoding the first encoded image data to generate decoded image data;
    determining at least one encoding parameter to be used to re-encode the decoded image data as a function of the retrieved encoding complexity level information; and
    re-encoding the generated decoded image data using the encoding parameter determined as a function of the retrieved encoding complexity level information.

15. A method of operating a system to process image data for storage and retrieval, the method comprising the steps of:
    analyzing said image data to be encoded to determine, for each image represented by the image data, a level of encoding complexity;
    encoding said image data according to a first encoding format to generate first encoded image data;
    storing with the first encoded image data encoding complexity level information indicating at least one determined level of encoding complexity associated with the first encoded image data;

retrieving the first encoded image data and image content description information from the storage device;

decoding the first encoded image data to generate decoded image data;

determining at least one encoding parameter to be used to re-encode the decoded image data as a function of the retrieved image content description information; and re-encoding the generated decoded image data using the encoding parameter determined as a function of the retrieved image content description information.

16. A method of operating a system to process image data for storage and retrieval, the method comprising the steps of:

analyzing said image data to be encoded to determine, for each image represented by the image data, a level of encoding complexity;

encoding said image data according to a first encoding format to generate first encoded image data;

storing with the first encoded image data encoding complexity level information indicating at least one determined level of encoding complexity associated with the first encoded image data; and selecting the first encoding format from a plurality of supported encoding formats, as a function of the determined level of encoding complexity.

17. The method of claim 16, further comprising the step of:

receiving data storage limitation information; and wherein the step of selecting the first encoding format is also performed as a function of the received data storage limitation information.

18. A method of operating a system to process image data for storage and retrieval, the method comprising the steps of:

performing an automated scene analysis operation on said image data to be encoded to generate image content information said image content information indicating the type of scene depicted by said image data to be encoded;

encoding said image data according to a first encoding format to generate first encoded image data; and storing the generated image content information in a file with the first encoded image data.

19. A method of operating a system to process image data for storage and retrieval, the method comprising the steps of:

performing an automated scene analysis operation on said image data to be encoded to generate image content information;

encoding said image data according to a first encoding format to generate first encoded image data;

storing the generated image content information in a file with the first encoded image data;

receiving additional image content information from a user of the system;

storing the additional image content information in said file with the first encoded image data;

retrieving from storage the stored first encoded image data, said generated content information, and said additional content information;

selecting a second encoding format to be used for outputting images represented by said first encoded image data as a function of at least one of said generated content information and said additional content information; and re-encoding said first encoded image data to said second encoding format to generate second encoded image data.

20. The method of claim 19, wherein the generated image content information indicates the pictorial content of an image.

21. The method of claim 20, wherein the additional image content information includes a description of the pictorial content of at least one image.

22. The method of claim 20, wherein the step of re-encoding said first encoded image data includes:

decoding said first encoded image data to generate decoded image data; and re-encoding said first encoded image data using at least one encoding parameter generated as a function of said generated image content information.

23. A system for processing image data for storage and retrieval purposes, the system comprising:

a scene analysis module for performing scene analysis on said image data to generate image content information;

means for receiving additional image content information from a user of the system;

an encoder for encoding said image data according to a first encoding format to generate first encoded image data; and a storage device for storing the first encoded image data, said generated image content information and said additional image content information in a file.

24. A system for processing image data for storage and retrieval purposes, the system comprising:

a scene analysis module for performing scene analysis on said image data to generate image content information;

means for receiving additional image content information from a user of the system;

an encoder for encoding said image data according to a first encoding format to generate first encoded image data;

a storage device for storing the first encoded image data, said generated image content information and said additional image content information in a file;

means for retrieving from storage the stored first encoded image data, said generated content information, and said additional content information;

means for selecting, as a function of at least one of said generated content information and said additional content information, a second encoding format to be used for outputting images represented by said first encoded image data; and a second encoder for re-encoding said first encoded image data to said second encoding format to generate second encoded image data.

25. A system for processing data including at least one of image data and audio data, the system comprising:

an analysis module for analyzing data to be encoded and to assign one of a plurality of encoding levels of complexity to the data to be encoded;

an encoder for generating encoded data from said data to be encoded;

a file wrapper module for incorporating an encoding complexity level identifier indicating the encoding complexity level assigned to said data to be encoded and said encoded data into a single file; and a data storage device for storing said single file.

26. A system for processing encoded image data, the system comprising:

an analysis module for analyzing data to be encoded and to assign one of a plurality of encoding levels of complexity to the data to be encoded;

an encoder for generating encoded data from said data to be encoded;

a file wrapper module for incorporating an encoding complexity level identifier indicating the encoding complexity level assigned to said data to be encoded and said encoded data into a single file; and a data storage device for storing said single file; and a preview module coupled to said encoder and said analysis module for displaying a subset of the images represented by encoded data generated by said encoder, the displayed images being selected for display as a function of encoding complexity level information associated with said encoded data.

27. The system of claim 26, wherein the preview module selects images represented by image data assigned a higher than average encoding complexity level for display.

* * * * *